Nov. 5, 1968  D. H. DURLAND ETAL  3,409,212
APPARATUS FOR CONTROLLING CENTRIFUGE ROTOR TEMPERATURE
Filed July 14, 1966  2 Sheets-Sheet 1

INVENTORS
DOUGLAS H. DURLAND
ROBERT J. EHRET

INVENTORS
DOUGLAS H. DURLAND
ROBERT J. EHRET

United States Patent Office 3,409,212
Patented Nov. 5, 1968

3,409,212
APPARATUS FOR CONTROLLING CENTRIFUGE
ROTOR TEMPERATURE
Douglas H. Durland, Palo Alto, and Robert J. Ehret, Los
Altos, Calif., assignors to Beckman Instruments, Inc.,
a corporation of California
Filed July 14, 1966, Ser. No. 565,138
11 Claims. (Cl. 233—11)

ABSTRACT OF THE DISCLOSURE

A system for maintaining the temperature of a rotor in an ultracentrifuge at a predetermined level including a radiometer for continuously monitoring the temperature of the rotor, a refrigeration unit thermally coupled to the rotor for maintaining the rotor at a predetermined temperature level, and a switching means connected between the radiometer and the refrigeration unit for actuating the refrigeration unit when the rotor temperature deviates from the predetermined temperature level. An anticipation signal source is also actuated by the switching circuit to provide an error or offset signal which is coupled to the switching circuit to cause it to turn off the refrigeration unit before the rotor temperature is actually at the desired predetermined level. In this manner the system compensates for the rotor temperature lagging the instantaneous temperature of the refrigeration unit.

---

Figure 1A:
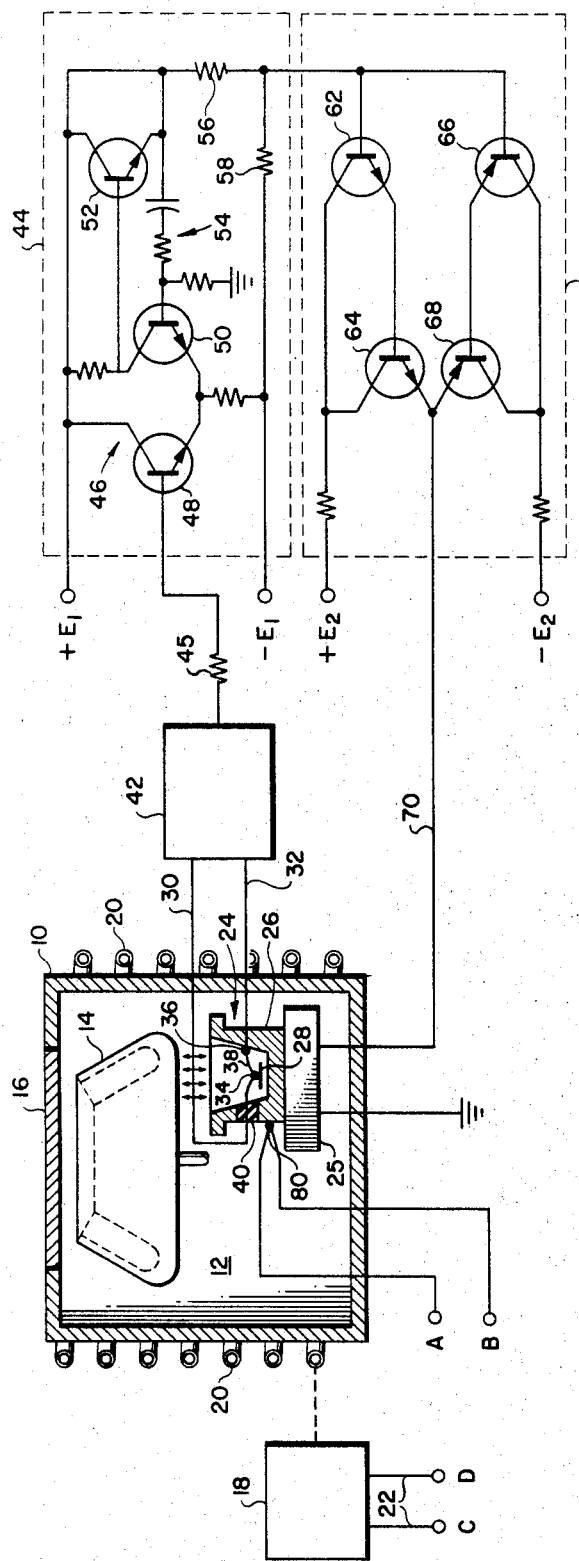

This invention relates generally to apparatus for controlling the temperature of centrifuge rotors which are mounted for rotation in a temperature-controlled environment and particularly, to apparatus for producing an anticipatory temperature signal to minimize rotor temperature overshoot. The temperature control requirements of high speed laboratory centrifuge systems are explained generally in U.S. Patent No. 2,885,188 issued to E. G. Pickels et al. on May 5, 1959 and assigned to the assignee of the present application.

In preparative and analytical centrifuges, a rotor, having several cavities for supporting tubes holding the sample solution to be centrifuged, is spun at high rotational speed in an enclosure defining a vacuum chamber. Temperature gradients through the rotor are sought to be minimized so that as little error as possible is introduced into computations such as those required to determine molecular weight. Temperature changes are also sought to be avoided to prevent any adverse effect upon the material being centrifuged.

Generally, a temperature regulating means, including a refrigeration unit having coils surrounding the vacuum chamber enclosure, is utilized in conjunction with an automatic temperature control system to hold the rotor temperature substantially constant. The refrigerant supplied to the coils by the refrigeration unit functions to offset rotor temperature increases which would otherwise result, for example from conduction of heat along the drive shaft from the drive motor and transmission. It may also be desirable, as in the case where unusually labile materials are being centrifuged, to maintain the rotor temperature at a reduced level compared with normal room temperature.

Besides maintaining constant temperatures over long periods of time during centrifugation, the temperature must also be accurately known in order to obtain accurate computed results. Accordingly, a rotor temperature sensing element, connected to a temperature indicating meter by means of a suitable network, provides the operator with the appropriate temperature data.

When the rotor temperature regulating system receives a command to cool the rotor, the refrigeration unit is energized and immediately begins to supply refrigerant. Since the refrigeration coils are in close contact with the vacuum chamber enclosure surrounding the rotor, the chamber walls cool very rapidly. The rotor temperature however, because of the relatively large rotor mass involved, tends to lag the enclosure temperature. By the time the rotor temperature is reduced to the desired level, and the refrigeration system turned off, the rotor enclosure temperature is well below the rotor temperature and consequently the rotor continues to cool for some period of time. Undesirably large rotor temperature swings therefore occur. The rotor temperature similarly lags the chamber temperature in the warming direction, although in this direction the lag is not as great.

Accordingly, one overall object of the present invention is to provide a centrifuge rotor temperature control apparatus which includes an anticipation system which serves to minimize rotor temperature overshoot.

According to one specific, exemplary embodiment of the invention described and shown herein, there is provided a rotor temperature sensing means having an output connected through an appropriate temperature indicating circuit to a temperature meter. A controller, connected to operate a suitable rotor temperature regulating means, such as a refrigeration unit, functions in accordance with a preselected rotor temperature. Thus, whenever the rotor temperature exceeds the preselected or set point temperature, the controller is energized to turn the refrigeration unit on. Means interconnecting the controller and the indicating circuit is provided for introducing into the indicating circuit an offset or anticipation signal, representing a temperature increment, whereby temperature overshoot of the rotor is minimized. As an alternative, the offset signal may be applied to the rotor temperature sensing means.

Figure 2:
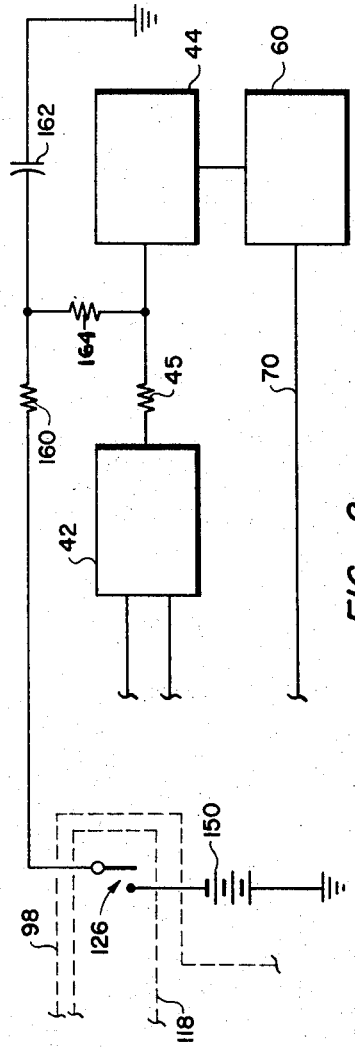
Figure 1B:
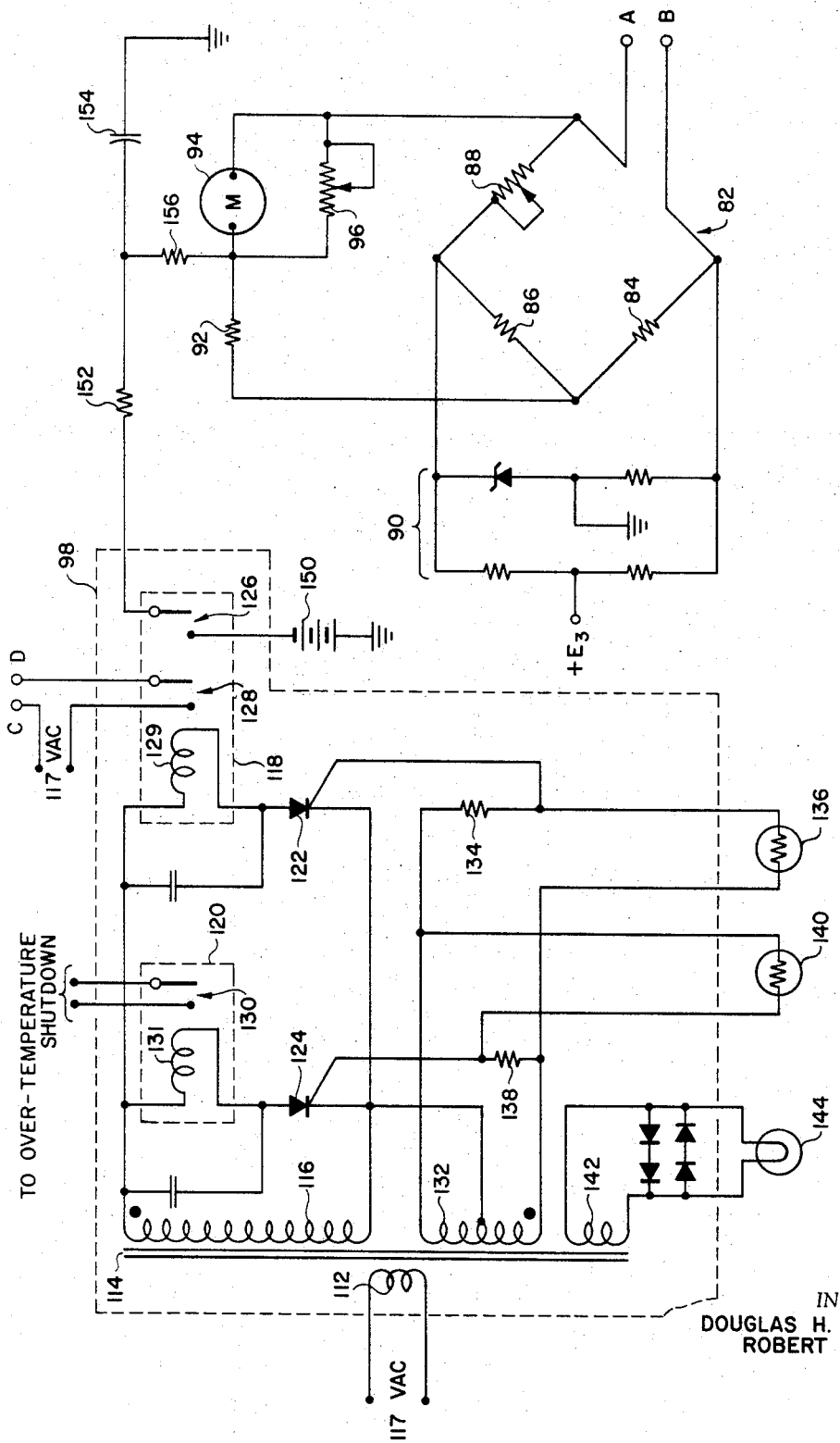

The novel features which are believed to be characteristic of the invention are set forth with particularity in the appended claims. The invention itself, however, together with further objects and advantages thereof, can best be understood by reference to the following description taken in connection with the accompanying drawings in which:

FIGS. 1A and 1B show a schematic diagram of a rotor temperature sensing, indicating and control apparatus in accordance with one exemplary embodiment of the present invention; and FIG. 2 is a schematic diagram of a portion of a rotor temperature sensing and control apparatus in accordance with another exemplary embodiment of the present invention.

Referring to FIG. 1A, there is shown an enclosure 10 defining a vacuum chamber 12 in which a centrifuge rotor 14 is mounted to spin about its vertical axis. The rotor depicted is of the type carrying samples in test tubes disposed at an angle with respect to the axis of rotation. A removable cover plate 16 permits access to the vacuum chamber 12 for the installation and removal of the various rotors which may be used with the centrifuge machine. The rotor chamber 12 is evacuated by suitable means (not shown) which produces a high vacuum within the chamber. Added protection against rotor explosion is provided by a fixed steel guard ring (not shown) which surrounds the enclosure 10.

When the rotor is operated at full speed within the evacuated chamber 12, its rate of temperature rise may typically be in the neighborhood of 1° C. per hour, with the surroundings at a comparable temperature. This gradual temperature rise can be eliminated by adjusting the average temperature of the immediate rotor surroundings about 10°–15° C. below the rotor. Thus, the enclosure 10 is typically cooled by means of a refrigeration unit 18 which supplies refrigerant to coils 20 closely enveloping the enclosure 10. It is to be understood that the block 18 in FIG. 1A, which represents the refrigeration unit, includes all the necessary components such as a compressor unit and energizing solenoids. Electrical power to energize the refrigerator unit solenoid is applied to the terminals C and D via the leads 22.

A circuit means is provided for sensing, indicating and controlling the temperature of the centrifuge rotor 14. The temperature sensing portion of the circuit is shown in FIG. 1A. It is to be understood that the temperature sensor to be described does not form the exclusive temperature sensing means which may be used. Other temperature sensors will suggest themselves to those with ordinary skill in this art. A thermal sensor, such as an infrared radiometer 24, is mounted proximate the lower (blackened) surface of the rotor 14. A suitable radiometer is disclosed in application Ser. No. 485,053 filed Sept. 3, 1965, entitled Temperature Measurement and Control Apparatus and assigned to the assignee herein. The radiometer 24 includes a housing 26 and a radiant energy detector 28 in the form of a thin metal disc mounted inside the housing. The housing 26 is suitably shaped so as to block out any radiant energy rays which would otherwise couple the detector 28 with other portions of the apparatus such as the chamber enclosure 10. The radiometer 24 is mounted on a thermoelectric module 25, the function of which will be described in detail below.

A copper-constantan differential thermocouple, connected to external copper leads 30 and 32, includes a junction 34 on the detector 28 and a junction 36 on the housing 26 and measures the temperature difference between the detector 28 and the housing 26. A constantan wire 38 is connected between the junctions 34 and 36; the copper lead 30 is passed through an insulator 40 mounted in the wall of the radiometer housing 26. When the detector 28 is cooler than the housing 26, the junction 34 is the cold junction and lead 32 is positive with respect to the lead 30. The opposite polarity exists when the housing is cooler than the detector.

The differential temperature output which appears across leads 30 and 32 is applied to a first amplifier 42. This amplifier may be of the modulated-carrier-type permitting high gain D.C. amplification with very low drift. A further amplifying stage 44, coupled to the output of the amplifier 42 through a resistor 45, includes an emitter-coupled differential amplifier 46 comprising transistors 48 and 50 and an emitter follower amplifier 52. The differential amplifier 46 provides temperature-compensated voltage amplification while the emitter follower 52 provides current amplification. The output of the amplifier 42 is applied to the base of transistor 48 as a first input to the differential amplifier. A second, or reference, input is applied to the base of the transistor 50. A single-ended output, appearing at the collector of transistor 50, is applied to the base of the emitter follower transistor 52 which converts voltage gain to current gain. For stability, a portion of the output of the amplifier 52 is fed back to the base of the transistor 50 through a negative feedback circuit comprising a series RC (resistor-capacitor) network 54.

A voltage divider circuit, including resistors 56 and 58, interconnects the output of the transistor amplifier 52 and the input of a power ampliger stage 60. The amplifying stage 60 comprises a pair of cascaded NPN transistors 62 and 64 connected in parallel with a cascaded pair of PNP transistors 66 and 68. As is well known by those skilled in the art, the symbols NPN and PNP designate the type of impurities present in a transistor crystal and thus connote the charge characteristic of the carrier. That is, when a germanium crystal is doped with an element which donates free electrons to the crystal, such as antimony, the impurity is called a donor or N-type impurity. Conversely, when a germanium crystal is doped with an element which by its nature creates holes by accepting electrons, such as indium, the impurity is referred to as an acceptor or P-type impurity. An NPN transistor means that the transistor is constructed of a layer doped with a P-type element sandwiched between a pair of layers doped with an N-type element. Of course, just the opposite arrangement is true of a PNP transistor. The output of stage 60 is connected, via the conductor 70, to one terminal of the thermoelectric module 25. The thermoelectric module 25 contains a Peltier element which is used to control the temperature of the radiometer housing 26. Peltier elements are devices formed from two materials in contact with one another and which are so chosen that passage of a unidirectional current in one direction through the junction between them results in cooling of the junction while the passing of current in the opposite direction results in heating of the junction. The rate of cooling and heating of the junction is proportional to the magnitude of the current flowing through it.

When the rotor cools, the temperature of the radiant energy detector 28 tends to follow rapidly the rotor temperature and the resulting temperature difference between the detector 28 and the housing 26 appears as a corresponding electrical signal on the lead 32 which, during rotor cooling, is positive with respect to the lead 30. This positive signal is amplified by the amplifier stages 42 and 44 and turns on the pair of NPN transistors 62 and 64 while holding off the PNP transistors 66 and 68. This causes electron current to flow in the conductor 70 toward the source $+E_2$. With current flowing in this direction in the thermoelectric module circuit, the module cools and the temperature of the housing is reduced until equilibrium is reached and the output signal of the amplifier 42 is zero.

Heating of the rotor 14 causes a negative signal, proportional to the temperature difference between the housing 26 and the detector 28, to turn on the PNP transistors 66 and 68, current in the thermoelectric module 25 flowing in the conductor 70 in the oposite direction from the source $-E_2$ to heat the radiometer housing 26.

It may be seen from the foregoing that a radiometer servo system has been described which functions continually to drive the radiometer housing temperature toward the radiometer detector temperature. Thus, the temperature of the housing 26 is always substantially equivalent to the rotor temperature.

A second portion of the apparatus, shown in FIG. 1B, comprises the rotor temperature indicating and control circuit. The temperature of the radiometer housing 26 (which, as stated earlier, closely follows rotor temperature due to the action of the radiometer servo loop) is sensed by a temperature sensing element such as the thermistor 80 (FIG. 1A) securely bonded to the housing 26 to maintain good thermal contact. Thermistor 80 is connected to terminals A and B of a Wheatstone bridge 82 thereby forming an active arm of the bridge. Two fixed resistors 84 and 86 and a potentiometer 88 complete the bridge circuit. The potentiometer 88 is used to make zero adjustments to compensate for variations in thermistor resistance.

The bridge is powered by a Zener diode-regulated supply 90 connected to a source of positive voltage $E_3$. A load connected across the output of the bridge circuit 82 includes a resistor 92 coupled in series with the parallel combination of a meter 94 and a potentiometer 96. As in the case of the potentiometer 88, the potentiometer 96 functions also to compensate for thermistor resistance variations and is used to make span adjustments.

The meter 94, in a preferred embodiment, comprises part of an optical meter relay system used to control the flow of refrigerant to the coils 20 and to energize the rotor temperature overshoot anticipation circuit to be described below. The meter 94 itself may be a commercially available unit such as the Model 502-L (provided with double set points), manufactured by Assembly Products, Inc. of Chesterland, Ohio. Meter 94, in a manner to be described below, actuates a controller 98 which forms the other portion of the optical meter relay system.

Since the controller is also a commercially available component (for example, Model 903–A Control Package manufactured by Assembly Products, Inc.), the controller schematic in FIG. 1B has been somewhat simplified.

The controller 98 is supplied with electrical power from a 117 v. AC source applied across the primary winding 112 of a power transformer 114. A first secondary winding 116 powers a relay 118 connected in series with a silicon controlled rectifier (SCR) 122 across the winding 116. Also connected in series across the winding 116 is a relay 120 and an SCR 124. The relay 118 includes two sets of contacts 126 and 128 both closed by energization of the relay coil 129; the relay 120 has one set of contacts 130 closed by supplying power to the relay coil 131. A center-tapped winding 132 supplies a bridge-type circuit for triggering the SCR's 122 and 124. Included in this circuit is a resistor 134 and a first photoconductive cell 136 connected in series across the winding 132, the junction of the resistor 134 and the cell 136 being connected to the gate of the SCR 122. The photoconductive cell 136, mounted in the meter 94, is the "low set point cell" which serves to energize the relay 118. A resistor 138 interconnects the lower end of the winding 132 with the gate of the SCR 124. Interconnecting the upper end of the winding 132 and the junction of the resistor 138 and the gate of the SCR 124 is a second photoconductive cell 140, also located inside the meter 94, which may be termed the "high set point cell." The high set point circuit, energized by the cell 140, functions only as an over-temperature safety. The transformer 114 has a third secondary winding 142 which powers a small lamp 144 disposed within the meter 94.

Besides the indicator needle, the d'Arsonval movement in the meter 94 has attached to it a vane which alters the amount of light reaching the cells 136 and 140 from the lamp 144. When the vane is moved by the signal coil so that it comes between the light source 144 and one of the photoconductive cells, light is cut off and the resistance of the cell increases considerably. This change in resistance may be used to cause an in-phase or out-of-phase trigger to be applied to the gate of the corresponding SCR. An in-phase trigger is required to fire the SCR and energize the relay. In the circuit depicted, using the familiar dot notation, it will be seen that the upper end of the winding 116 and the lower end of the winding 132 have the same polarity. Thus, with respect to the AC bridge comprising the winding 132, the resistor 134 and the cell 136, when light strikes the cell 136, that is, when the indicating needle is above the lower set point, the cell resistance will be less than the resistance of the resistor 134 and a gate signal will be applied to the SCR 122 which is positive with respect to the cathode of the SCR. This signal will be in phase with the incoming line signal thereby energizing relay coil 129 and closing the contacts 126 and 128. When the indicating needle falls to the set point and the vane interrupts the light beam, the resistance of cell 136 increases above that of the resistor 134 and an out of phase signal will then be applied to the gate of the SCR 122. As a result, the SCR will not fire and the relay 118 will not be energized. The opposite holds true for the AC bridge circuit comprising the winding 132, the resistor 138 and the cell 140. In this case, when light strikes the cell 140, that is, when the indicator needle is below the upper set point, the SCR will not be triggered and the contacts 130 of relay 120 remain open. Conversely, when the indicating needle of meter 94 reaches the upper set point, the vane blocks the light to the cell 140 and an in-phase signal of the proper polarity is applied to the gate of the SCR 124 thereby energizing the relay 120. The lower set point of the meter 94 will be that temperature at which it is desired to maintain the rotor 14. The upper set point is set at the over-temperature point above which it is not safe or desirable to operate the centrifuge.

Contacts 128 are connected through a 117 v. AC supply to the terminals C and D of the refrigeration unit and closing of the contacts 128 will therefore cause refrigerant to flow in the coils 20 surrounding the chamber enclosure 10. This will occur any time the indicating needle of the meter 94 is above the lower set point.

As explained earlier, rotor temperature lags the enclosure temperature and it is therefore desirable, for the purpose of minimizing rotor temperature swings, to introduce into the apparatus an anticipation or offset signal which will "lead" the rotor temperature. Referring to FIG. 1B, a suitable offset signal may be derived from a D.C. source 150 which is connected through the contacts 126 of relay 118 to an RC circuit comprising a resistor 152 connected in series with a capacitor 154. It will be seen that a continuous circuit, including the return path through ground, is formed by the elements 150, 152 and 154 when the contacts 126 are closed. A resistor 156 interconnects the junction of the resistor 152 and capacitor 154 with the junction of the resistor 92 and the meter 94. Resistor 156 is substantially larger than the resistor 152, for example, the resistor 156 may be 1.5 meg. while the resistor 152 may be 220K. With the contacts 126 closed, the combination of the resistor 152 and the capacitor 154 form a low time constant network and the capacitor 154 will charge relatively rapidly from the source 150 through the resistor 152. With the contacts 126 open and the source 150 and the small resistor 152 thereby removed from the network, the large resistor 156 and the capacitor 154 together form a relatively long time constant circuit, the capacitor 154 slowly discharging through the large resistor.

In operation, when the meter 94 calls for cooling, contacts 126 and 128 close. The refrigerator unit is thereby turned on and a current flows from the source 150 through the small resistor 152 to quickly charge up the capacitor 154. A small voltage is thereby introduced into the bridge load circuit via the large resistor 156, which makes the meter 94 read about ½° C. low. If the system is not operating close to the low set point, then this offset remains in the indication and introduces a small error. This occurs during initial cooling of a warm rotor, where the refrigerator remains on for a long period. Under normal conditons, when operating around the set point, the offset drives the refrigerator off with a change of about .05° C., which action also removes the offset. Thus, no discernible error is introduced during the steady state condition. The primary function of the long time constant network comprising resistor 156 and capacitor 154 is to insure that by the time the error signal has reduced the meter indication, shutting off the refrigeration unit, and has returned to its substantially zero error position, the rotor has actually cooled to the lower set point of the meter 94. By choosing the appropriate components values, the entire system may be made extremely stable yet provide reliable anticipation.

In FIG. 2, an alternative approach to introducing the offset signal is shown. In this embodiment, an anticipation circuit, similar to that shown in FIG. 1B is used to introduce an offset signal into the radiometer servo loop. This circuit comprises the series combination of the voltage circuit 150, the contacts 126, a small resistor 160 and a capacitor 162. A large resistor 164 connects the junction of the small resistor 160 and the capacitor 162 with the input to the amplifying stage 44 in the radiometer servo loop. During the cooling phase, the contacts 126 are closed and the offset signal is introduced into the radiometer servo system which causes the cooling of the thermoelectric module 25 to lead the cooling of the rotor. The cooling of the radiometer housing 26 which results is sensed by the thermistor and thus the meter 94, which is now indicating a small error on the cooling side, causes the refrigerator unit to turn off sooner. With the refrigerator unit turned off and the contacts 126 open, the offset signal is removed through the long time constant network which insures that the radiometer, after being cooled by the offset introduced during refrigeration, does not heat up too rapidly after removal of the offset so that the rotor has an opportunity to cool to the lower set point.

It will be obvious to those skilled in the art that various modifications may be made to the specific, exemplary embodiments of the invention described. While particular embodiments have been discussed, it will be understood that the invention is not limited thereto and that it is contemplated to cover in the appended claims any such modifications as fall within the true spirit and scope of the invention.

What is claimed is:

1. An apparatus for controlling the temperature of a centrifuge rotor at a preselected level comprising
    means thermally coupled to said rotor for regulating the temperature of said rotor at said preselected level, changes in said rotor temperature lagging changes in the temperature of said temperature regulating means;
    means thermally coupled to said rotor for sensing said rotor temperature;
    means connected to said rotor temperature sensing means for applying to said sensing means an offset signal in a direction to minimize rotor temperature overshoot;
    switching means coupled to energize said temperature regulating means and said offset signal applying means, said rotor temperature sensing means being connected to said switching means for operating said switching means, the closing of said switching means energizing said temperature regulating means and said offset signal applying means.

2. An apparatus, as defined in claim 1, in which said offset signal applying means includes
    a D.C. voltage source;
    a first RC circuit, having a short time constant, connected to said D.C. voltage source through said switching means; and
    a second RC circuit, having a long time constant, said offset signal being introduced from said voltage source into said first RC circuit when said switching means is closed and removed through said second RC circuit when said switching means is opened.

3. An apparatus, as defined in claim 2, in which said rotor temperature sensing means includes
    a radiometer having a housing, a detector thermally coupled with said rotor, and an output voltage representing the difference between the temperatures of said detector and said housing;
    a thermoelectric module thermally coupled with said radiometer housing, said module cooling said housing when electrical current flow in one direction flows through said module and heating said housing when current in the opposite direction flows through said module; and
    means connecting said radiometer output with said thermoelectric module for controlling the direction of electrical current through said module to drive said radiometer housing temperature toward said radiometer detector temperature, said offset signal applying means being connected to said current direction controlling means.

4. An apparatus, as defined in claim 3, in which said means for controlling the direction of current through said thermoelectric module comprises a servo loop including the series combination of a modulated-carrier-type D.C. amplifier, a differential amplifier having a first input connected to the output of said D.C. amplifier and a reference input, a current amplifier and a power amplifier, said D.C. amplifier having its input connected to said radiometer output and said power amplifier having its output connected to said thermoelectric module, said power amplifier output supplying current in one direction when said radiometer output voltage has one polarity and in the opposite direction when said radiometer output voltage has the opposite polarity;
    said first RC circuit includes the series combination of a small resistor and a capacitor serially connected to said switching means and said voltage source; and
    said second RC circuit includes a large resistor and said capacitor, said large resistor interconnecting the junction of said small resistor and said capacitor with the junction of said D.C. amplifier and said first input of said differential amplifier.

5. An apparatus for controlling the temperature of a centrifuge rotor at a preselected level, comprising
    means thermally coupled to said rotor for regulating the temperature of said rotor at said preselected level, changes in said rotor temperature lagging changes in the temperature of said temperature regulating means;
    means thermally coupled to said rotor for sensing said rotor temperature;
    means for applying an offset signal, representing a temperature increment, in a direction to minimize rotor temperature overshoot;
    switching means coupled to energize said temperature regulating means and said offset signal applying means; and
    circuit means interconnecting said rotor temperature sensing means and said switching means for operating said switching means, said offset signal applying means being connected to said circuit means.

6. An apparatus, as defined in claim 5, in which said offset signal applying means includes
    a D.C. voltage source;
    a first RC circuit, having a short time constant, connected through said switching means to said D.C. voltage source; and
    a second RC circuit having a long time constant, said offset signal being introduced from said voltage source into said circuit means through said first RC circuit when said switching means is closed and removed through said second RC circuit when said switching means is opened.

7. An apparatus, as defined in claim 6, in which said circuit means includes
    a bridge circuit connected to a power supply and having a load network across its output, said rotor temperature sensing means forming an active arm of said bridge, said offset signal applying means being connected to said bridge load network.

8. An apparatus, as defined in claim 7, which includes an optical meter relay comprising a meter forming at least a portion of said bridge load and a controller incorporating said switching means, said meter having a lower adjustable set point for preselecting said rotor temperature and an indicator needle, said switching means closing when said needle is above said lower set point;
    and in which
        said first RC circuit includes the series combination of a small resistor and a capacitor serially connected to said switching means and said voltage source; and
        said second RC circuit includes a large resistor and said capacitor, said large resistor interconnecting the junction of said small resistor and said capacitor with said bridge load network.

9. An apparatus, as defined in claim 8, in which said meter has a selectable upper set point and said controller includes second switching means operable to close when said indicating needle moves up to said upper set point, said second switching means being connected to energize an overtemperature device for shutting down said centrifuge.

10. An apparatus for controlling the temperature of a centrifuge rotor at a preselected level comprising refrigeration means thermally coupled to said rotor for regulating said rotor temperature at a preselected level, changes in said rotor temperature lagging changes in the temperature of said refrigeration means;

a radiometer having a housing, a detector thermally coupled with said rotor, and a voltage output representing the difference between the temperature of said detector and said housing;

a thermoelectric module thermally coupled with said radiometer housing, said module cooling when electrical current flows in one direction through said module and heating when current in the opposite direction flows through said module;

means connecting said radiometer output with said thermoelectric module for controlling the direction of current through said module to drive said radiometer housing temperature toward said radiometer detector temperature, said connecting means including the series combination of a modulated-carrier-type D.C. amplifier, a differential amplifier having a first input connected to the output of said D.C. amplifier and a reference input, a current amplifier and a power amplifier, said D.C. amplifier having its input connected to said radiometer output and said power amplifier having its output connected to said thermoelectric module, said power amplifier output supplying current in one direction when said radiometer output voltage has one polarity and in the opposite direction when said radiometer output voltage has the opposite polarity;

a thermistor attached to said radiometer housing and having an output substantially representative of said actual rotor temperature;

a Wheatstone bridge circuit connected to a power supply and having an active arm including said thermistor, said bridge circuit having a load circuit connected across its output;

an optical meter relay including a meter connected in said bridge load circuit and having an adjustable lower set point for preselecting a rotor temperature and an indicator needle, said optical meter relay including a controller having a relay with two sets of contacts the first set of which is connected to energize said refrigeration unit upon being closed, said relay being energized when said needle is above said lower set point; and an offset signal network including a loop circuit comprising the series combination of a source of D.C. voltage, the second set of contacts, a small resistor and a capacitor, said network including a large resistor interconnecting the junction of said small resistor and said capacitor with said bridge load circuit, energization of said relay closing said two sets of contacts thereby energizing said refrigeration means and causing said capacitor to charge rapidly through said small resistor thereby applying said offset signal across said large resistor to said bridge load circuit, de-energization of said relay opening said two sets of contacts thereby shutting off said refrigeration means and causing said offset signal to be removed slowly by discharge of said capacitor through said large resistor.

11. For use with a centrifuge rotor temperature control system, an anticipation signal circuit for applying an offset signal to said control system for minimizing rotor temperature overshoot, comprising a loop network including the series combination of a D.C. voltage source, a switch, a small resistor and a capacitor; and a large resistor having one end connected to the junction of said small resistor and said capacitor, said offset signal being derived at the other end of said large resistor.

References Cited

UNITED STATES PATENTS

| | | | |
|---|---|---|---|
| 2,627,182 | 2/1953 | Quereau et al. | 73—351 |
| 2,785,860 | 3/1957 | Harrison et al. | 236—15 |
| 3,246,688 | 4/1966 | Colburn | 233—11 |
| 3,347,453 | 10/1967 | Goergen | 233—11 |

HENRY T. KLINKSIEK, *Primary Examiner.*

UNITED STATES PATENT OFFICE
CERTIFICATE OF CORRECTION

Patent No. 3,409,212　　　　　　　　　　　　　　　　　November 5, 1968

Douglas H. Durland et al.

It is certified that error appears in the above identified patent and that said Letters Patent are hereby corrected as shown below:

Column 7, line 41, after "into said" insert -- rotor temperature sensing means through said --.

Signed and sealed this 3rd day of March 1970.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents